US011400621B2

(12) United States Patent
Stott

(10) Patent No.: US 11,400,621 B2
(45) Date of Patent: Aug. 2, 2022

(54) METHODS FOR FORMING NOISE ABSORBING BARRIER WALLS AND RELATED FORMS

(71) Applicant: Intellectual Property Management LLC, Salt Lake City, UT (US)

(72) Inventor: Gale J. Stott, Salt Lake City, UT (US)

(73) Assignee: Intellectual Property Management, LLC, Salt Lake City, UT (US)

(*) Notice: Subject to any disclaimer, the term of this patent is extended or adjusted under 35 U.S.C. 154(b) by 614 days.

(21) Appl. No.: 16/359,701

(22) Filed: Mar. 20, 2019

(65) Prior Publication Data

US 2019/0292738 A1    Sep. 26, 2019

Related U.S. Application Data

(60) Provisional application No. 62/645,558, filed on Mar. 20, 2018.

(30) Foreign Application Priority Data

Apr. 19, 2018 (CA) .................................. CA 3002249

(51) Int. Cl.
*B29C 39/02* (2006.01)
*B29C 39/10* (2006.01)
(Continued)

(52) U.S. Cl.
CPC .......... *B29C 39/025* (2013.01); *B28B 7/0073* (2013.01); *B28B 7/0088* (2013.01);
(Continued)

(58) Field of Classification Search
CPC ....... B28B 7/0073; B28B 7/0088; B28B 7/08; B28B 7/082; B28B 7/087; B29C 39/025;
(Continued)

(56) References Cited

U.S. PATENT DOCUMENTS 3,257,484 A * 6/1966 Barnette ............... B29C 39/265
264/46.2
3,761,554 A * 9/1973 Barnette ................. B29C 33/14
264/69
(Continued)

FOREIGN PATENT DOCUMENTS

CH     242549 A  *  5/1946  ........... B28B 1/0873
DE     826259 C  * 12/1951  ............. B28B 19/00
(Continued)

OTHER PUBLICATIONS

Translation of DE 2101093. (Year: 1972).*

*Primary Examiner* — Michael Safavi
(74) *Attorney, Agent, or Firm* — Workman Nydegger

(57) ABSTRACT

A barrier wall is formed by rotating a mold to a horizontal orientation so that a rear wall of the mold is horizontally disposed and an encircling sidewall upstands from the rear wall, the floor and encircling sidewall at least partially bounding a compartment, an upper end of the encircling sidewall at least partially bounding a first access opening to the compartment. A first material is disposed into the compartment through the first access opening, at least a portion of the material being curable. A cover is placed over the first access opening to enclose the compartment. The mold is then rotated from the horizontal orientation to a vertical orientation. A portion of the sidewall is then moved to form a second access opening to the compartment. A second material is then dispensed into the compartment, at least a portion of the second material being curable.

28 Claims, 13 Drawing Sheets

(51) Int. Cl.
*B29C 39/12* (2006.01)
*B29C 39/24* (2006.01)
*B28B 7/00* (2006.01)
*B28B 7/08* (2006.01)
*E04G 11/08* (2006.01)
*B29C 39/26* (2006.01)

(52) U.S. Cl.
CPC .............. *B28B 7/082* (2013.01); *B29C 39/10* (2013.01); *B29C 39/123* (2013.01); *B29C 39/24* (2013.01); *B29C 39/265* (2013.01); *E04G 11/08* (2013.01)

(58) Field of Classification Search
CPC ....... B29C 39/04; B29C 39/10; B29C 39/123; B29C 39/24; B29C 39/265; E04G 11/32
See application file for complete search history.

(56) References Cited

U.S. PATENT DOCUMENTS

| | | | | |
|---|---|---|---|---|
| 3,787,544 A | * | 1/1974 | Barnette | B29C 39/10 |
| | | | | 264/69 |
| 3,832,264 A | * | 8/1974 | Barnette | B29C 70/72 |
| | | | | 428/71 |
| 3,922,413 A | * | 11/1975 | Reineman | B32B 13/12 |
| | | | | 428/119 |
| 3,932,082 A | * | 1/1976 | Beaman | B28B 7/0088 |
| | | | | 425/125 |
| 4,075,380 A | * | 2/1978 | Moens | B28B 1/16 |
| | | | | 428/140 |
| 4,077,757 A | * | 3/1978 | DeCoster | B28B 1/093 |
| | | | | 249/137 |
| 4,183,188 A | * | 1/1980 | Goldsby | B28B 1/16 |
| | | | | 106/660 |
| 4,189,886 A | * | 2/1980 | Frohlich | E04D 7/00 |
| | | | | 52/302.1 |
| 4,229,497 A | * | 10/1980 | Piazza | B28B 19/003 |
| | | | | 264/256 |
| 4,559,263 A | * | 12/1985 | Roodvoets | B32B 13/12 |
| | | | | 428/312.4 |
| 5,887,404 A | | 3/1999 | Stott | |
| 7,665,712 B2 | | 2/2010 | Stott | |
| 7,802,409 B2 | | 9/2010 | Stott | |
| 8,162,638 B2 | | 4/2012 | Stott | |
| 8,424,261 B2 | * | 4/2013 | Collier | E04C 1/41 |
| | | | | 52/309.12 |
| 2004/0070106 A1 | * | 4/2004 | Harrington | B29C 33/50 |
| | | | | 264/227 |
| 2005/0056959 A1 | * | 3/2005 | Shyu | B29C 39/265 |
| | | | | 264/102 |
| 2009/0173872 A1 | | 7/2009 | Stott | |
| 2011/0056165 A1 | * | 3/2011 | Charles, Jr. | B28B 7/0073 |
| | | | | 52/742.14 |
| 2016/0010346 A1 | * | 1/2016 | Calmes | E04G 9/10 |
| | | | | 249/15 |

FOREIGN PATENT DOCUMENTS

| | | | | |
|---|---|---|---|---|
| DE | 2101093 A1 | * | 7/1972 | ............ B28B 7/082 |
| DE | 2731003 A1 | * | 1/1978 | ............ B32B 21/10 |
| DE | 3817224 A1 | * | 11/1989 | ............ A47B 96/18 |
| DE | 29503166 U1 | * | 4/1995 | ........... B28B 7/0044 |
| GB | 363637 A | * | 12/1931 | ........... B28B 7/0073 |
| GB | 2338681 A | * | 12/1999 | ......... B29C 33/3878 |
| WO | WO-9836890 A1 | * | 8/1998 | ........... B29C 39/265 |
| WO | WO-2008037825 A1 | * | 4/2008 | ........ B29C 33/3857 |

\* cited by examiner

METHODS FOR FORMING NOISE ABSORBING BARRIER WALLS AND RELATED FORMS

CROSS-REFERENCE TO RELATED APPLICATIONS

This application claims the benefit of U.S. Provisional Application No. 62/645,558, filed Mar. 20, 2018, and claims priority to Canadian Application No. 3,002,249, fled Apr. 19, 2018, which are incorporated herein by specific reference.

BACKGROUND OF THE INVENTION

1. The Field of the Invention

The present invention relates to methods for forming noise absorbing barrier walls and related forms.

2. The Relevant Technology

Noise absorbing barrier walls are commonly placed along one or both opposing sides of highways or freeway that are located adjacent to residential areas. The noise absorbing barrier walls have a first side formed of a noise absorbing material and an opposing second side formed of concrete. The concrete second side provides structural support and stability for the noise absorbing first side. During use, the noise absorbing barrier walls are erected so that the noise absorbing first side faces toward the highway or freeway so that the noise absorbing material assists in absorbing noise generated by vehicles traveling along the highway or freeway.

Noise absorbing barrier walls are typically formed by using a pan mold having an enlarged horizontal floor with a short encircling sidewall upstanding from the floor. The floor and the encircling sidewall partially bound a compartment having an open top. During manufacture, a layer of noise absorbing material is first deposited on top of the floor within the compartment. A layer of concrete is then poured over the layer of the noise absorbing material within the compartment. The materials are then allowed to harden together so that the exterior surface of the noise absorbing side of the barrier wall is formed against that floor and the exterior surface of the concrete side of the barrier wall is openly exposed. Once the materials have hardened into a structural wall, the noise absorbing barrier wall is removed from the pan mold and is ready to be erected along a highway or freeway.

Although the above mold and method are useful, they have some shortcomings. For example, as a result of the enlarged floor of the pan mold being horizontally disposed as the materials harden, the mold occupies a large area of space. This can make it difficult to simultaneously produce multiple noise absorbing barrier walls.

In addition, it can be desirable to have an aesthetic design formed on each opposing side of the noise absorbing barrier wall. On the noise absorbing side of the barrier wall, the design can be produced by forming the design on the interior surface of the floor. In turn, the design is transferred to the noise absorbing side of the barrier wall as the material rests and hardens on the floor. However, the concrete side of the barrier wall is openly exposed, making it difficult to produce the design on that side. Although a cover could be placed on top of the mold, it is very difficult to both precisely fill the mold with concrete and precisely attach a cover to the mold so that a design formed on the interior surface of the cover is transferred to the concrete side of the barrier wall. That is, if the large surface area of the concrete side of the barrier wall is too high or too low, the cover can either be difficult to attach or fail to transfer the design to the barrier wall.

Another problem with using pan molds to form noise absorbing walls is that it takes an extended period of time before the barrier walls can be demolded and erected. That is, it is typically desirable to remove the barrier walls from the molds as soon as possible so that the molds can be reused to form a new barrier wall. However, barrier walls that are in a horizontal position are in a weaker or more fragile state, relative to walls that are vertically erected. As such, barrier walls in a horizontal orientation must be left for an extended period of time to cure and harden before they can be demolded and moved to a vertical storage position. Other shortcomings also exist.

Accordingly, what is needed in the art are methods and/or forms that overcome one or more of the current problems associated with producing noise absorbing barrier walls.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
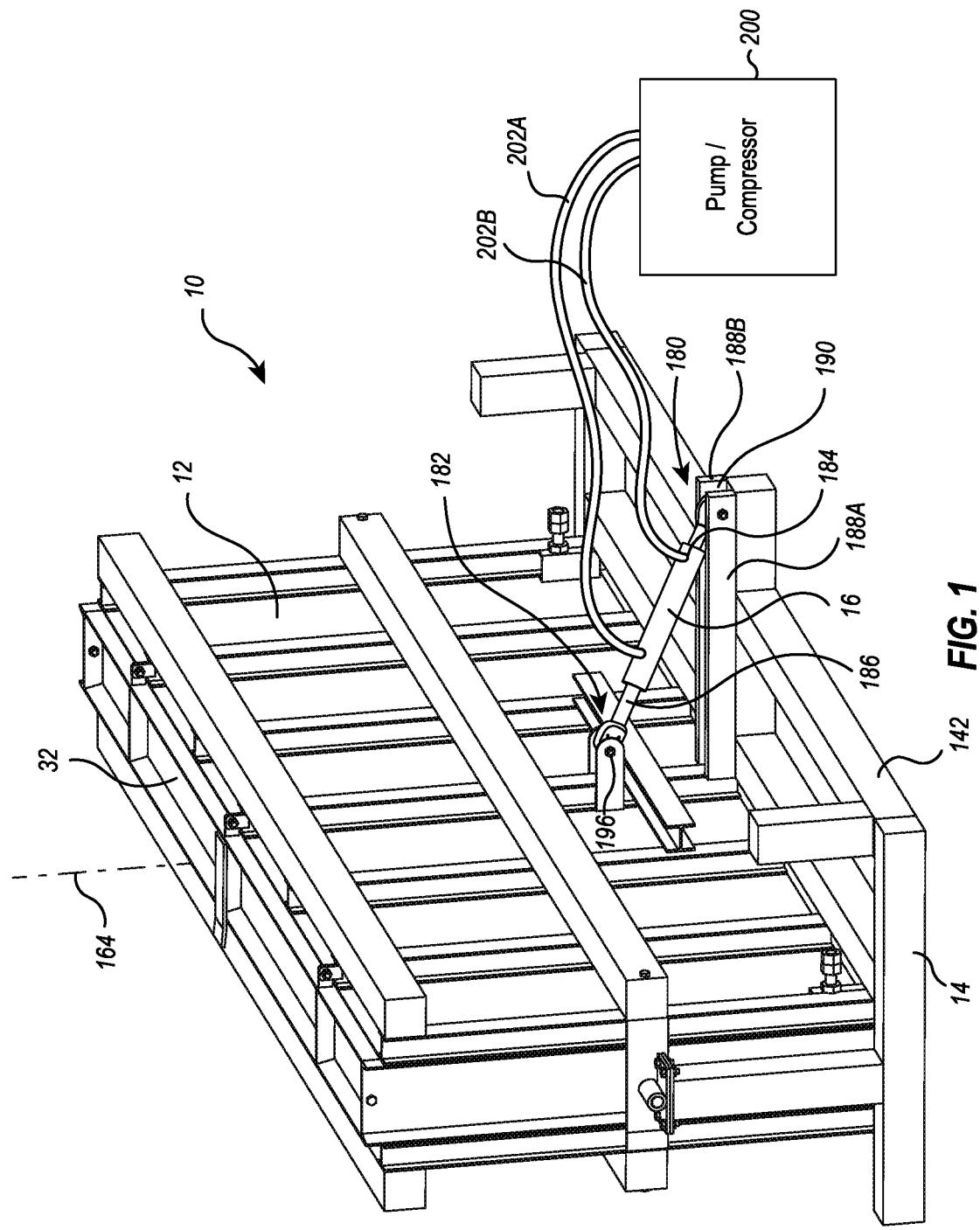
FIG. 1 is a front perspective view of a form for forming a noise absorbing barrier wall with the mold thereof in a vertical orientation.

Before describing the present disclosure in detail, it is to be understood that this disclosure is not limited to parameters of the particularly exemplified systems, methods, apparatus, products, processes, compositions, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and apparatus similar or equivalent to those described herein can be used in the practice of the present disclosure, only certain exemplary methods and apparatus are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "cylinder" includes one, two, or more cylinders.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including in the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering (e.g., element "10" and element "210.") Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

The present invention relates to methods for forming noise absorbing barrier walls and forms used in producing such walls. The noise absorbing barrier walls are typically placed along one or opposing sides of a roadway, such as a highway, freeway, city road or the like, and are used to decrease or absorb noise generated by traffic moving along the roadway. In alternative uses, the noise absorbing barrier walls can also be placed at other locations where it is desired to decrease noise pollution, such as around or along raceways, outdoor stadiums, manufacturing facilities, warehouses or other event centers or facilities where it is desired to control or limit noise. Other uses are also applicable.

Figure 2:
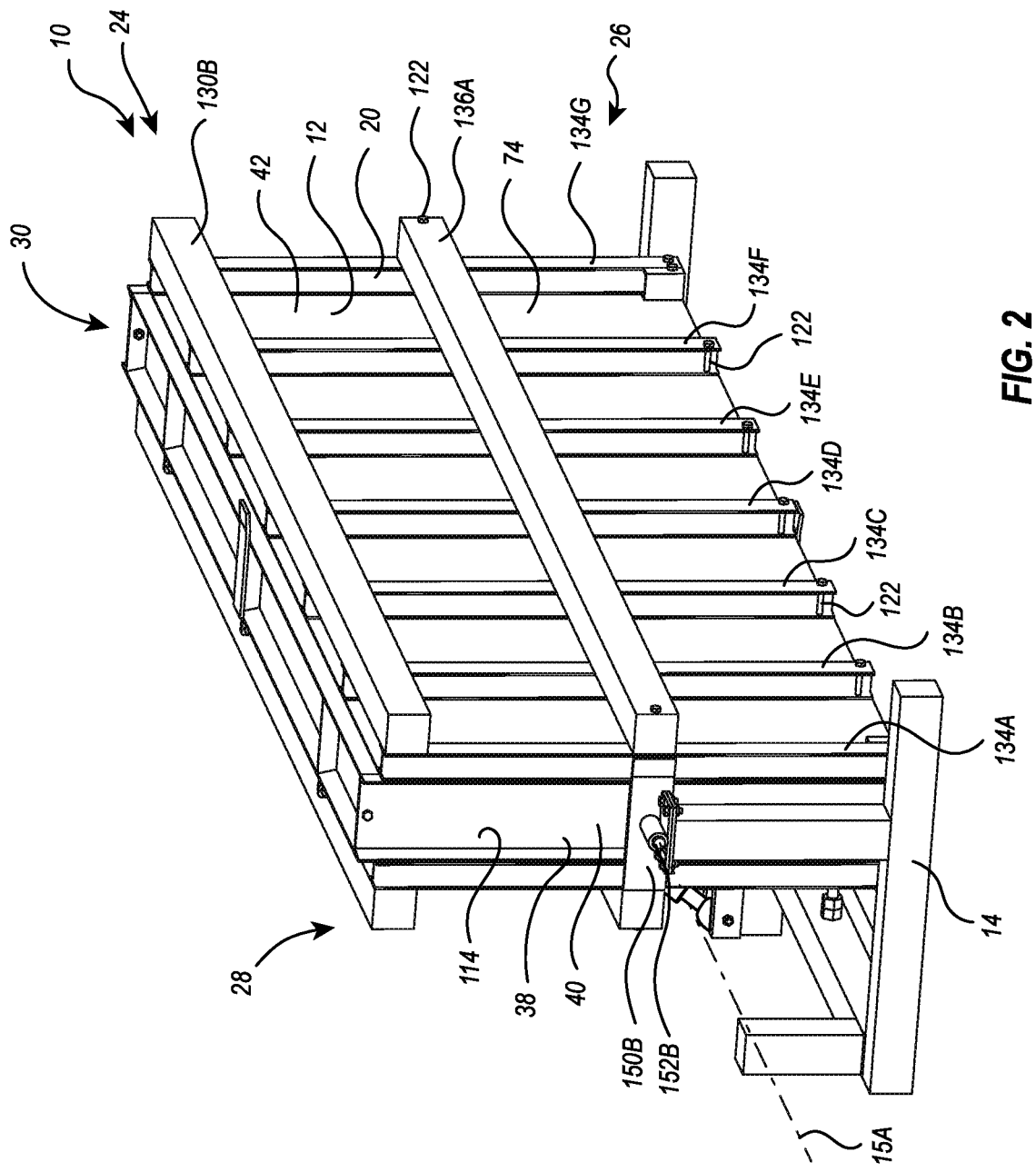
FIG. 2 is a rear perspective view of the form shown in FIG. 1.

Depicted in FIGS. 1 and 2 is one embodiment of an inventive form 10 for use in forming a barrier wall and, more specifically, a noise absorbing barrier wall. In general, form 10 comprises a mold 12 in which the barrier wall is formed and a stand 14 on which mold 12 is supported. As discussed below, stand 14 is configured so that mold 12 can be rotated between a vertical orientation and a horizontal orientation. An expansion cylinder 16, such as a hydraulic or pneumatic cylinder, or other mechanisms, can be used to selectively move mold 12 between the vertical orientation and the horizontal orientation.

Figure 3:
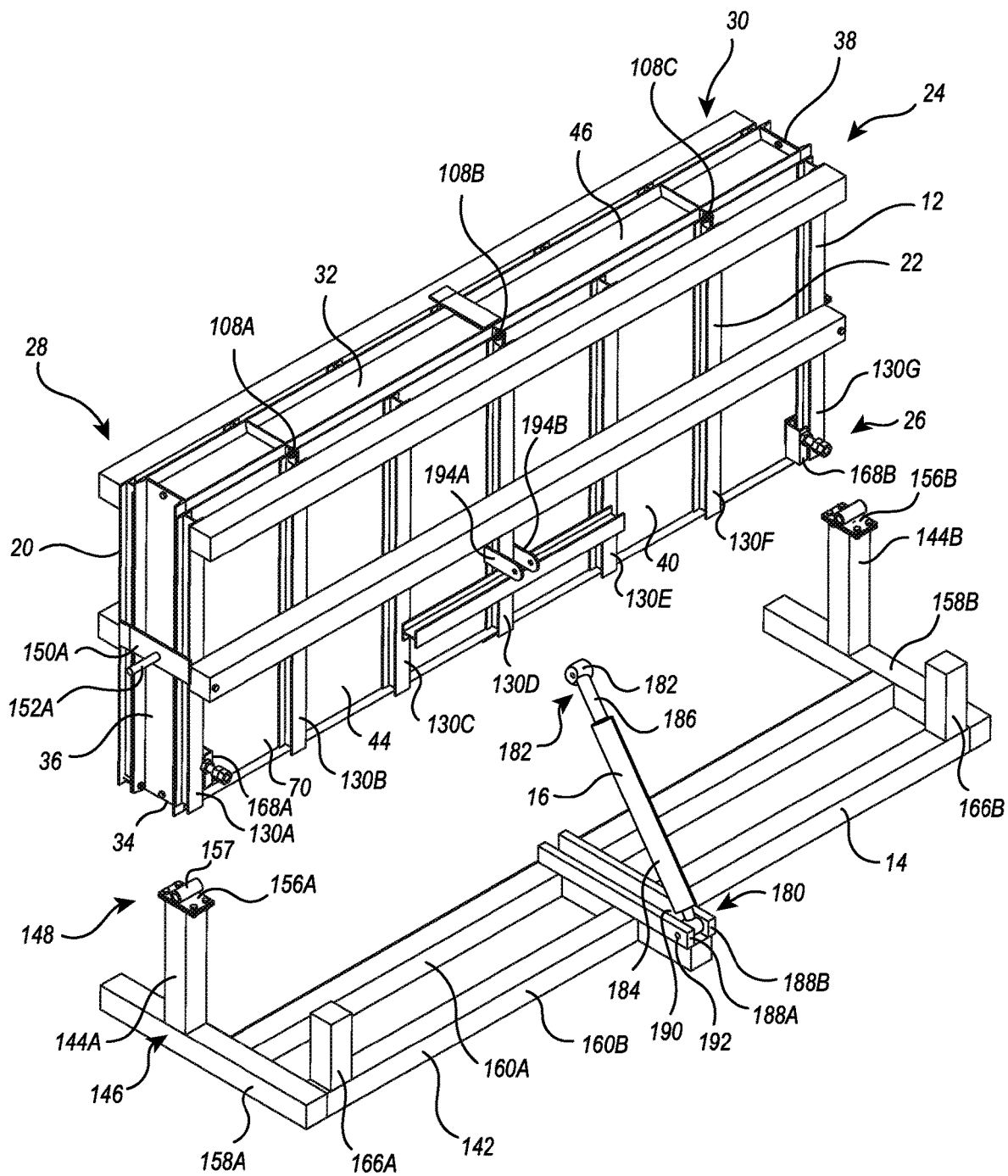
FIG. 3 is a partially exploded view of the form shown in FIG. 1.

Depicted in FIG. 3, mold 12 generally has a box shaped configuration that includes a front wall 20 and an opposing rear wall 22 that each extend between an upper end 24 and an opposing lower end 26 and that also extend between a first side end 28 and an opposing second side end 30. Mold 12 further includes a top wall 32 extending between walls 20 and 22 at upper end 24; a bottom wall 34 extending between walls 20 and 22 at lower end 26; a first side wall 36 extending between walls 20 and 22 at first end 28; and a second side wall 38 extending between walls 20 and 22 at second end 30.

Figure 4:
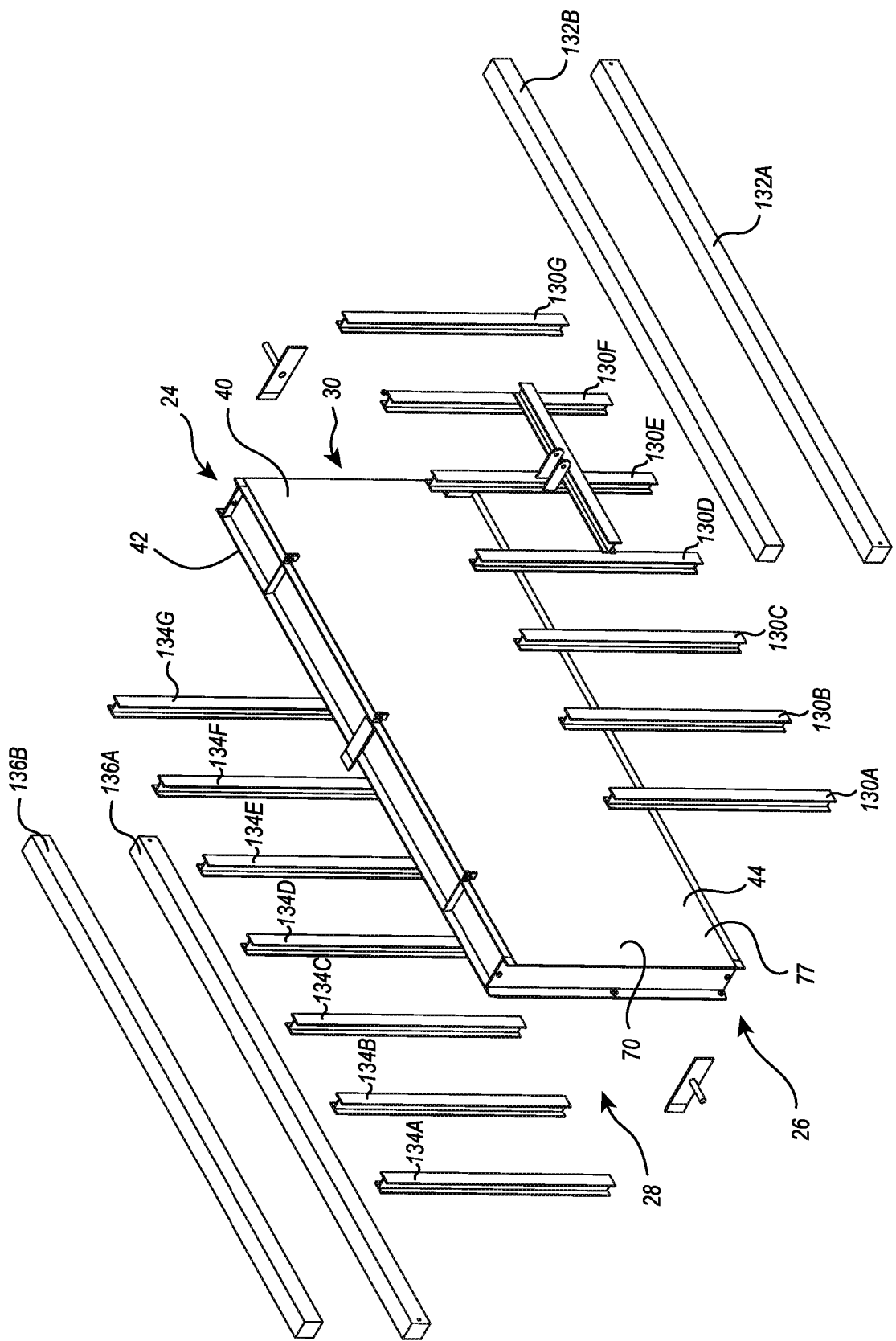
FIG. 4 is a partially exploded view of the mold of the form shown in FIG. 3.
Figure 5:
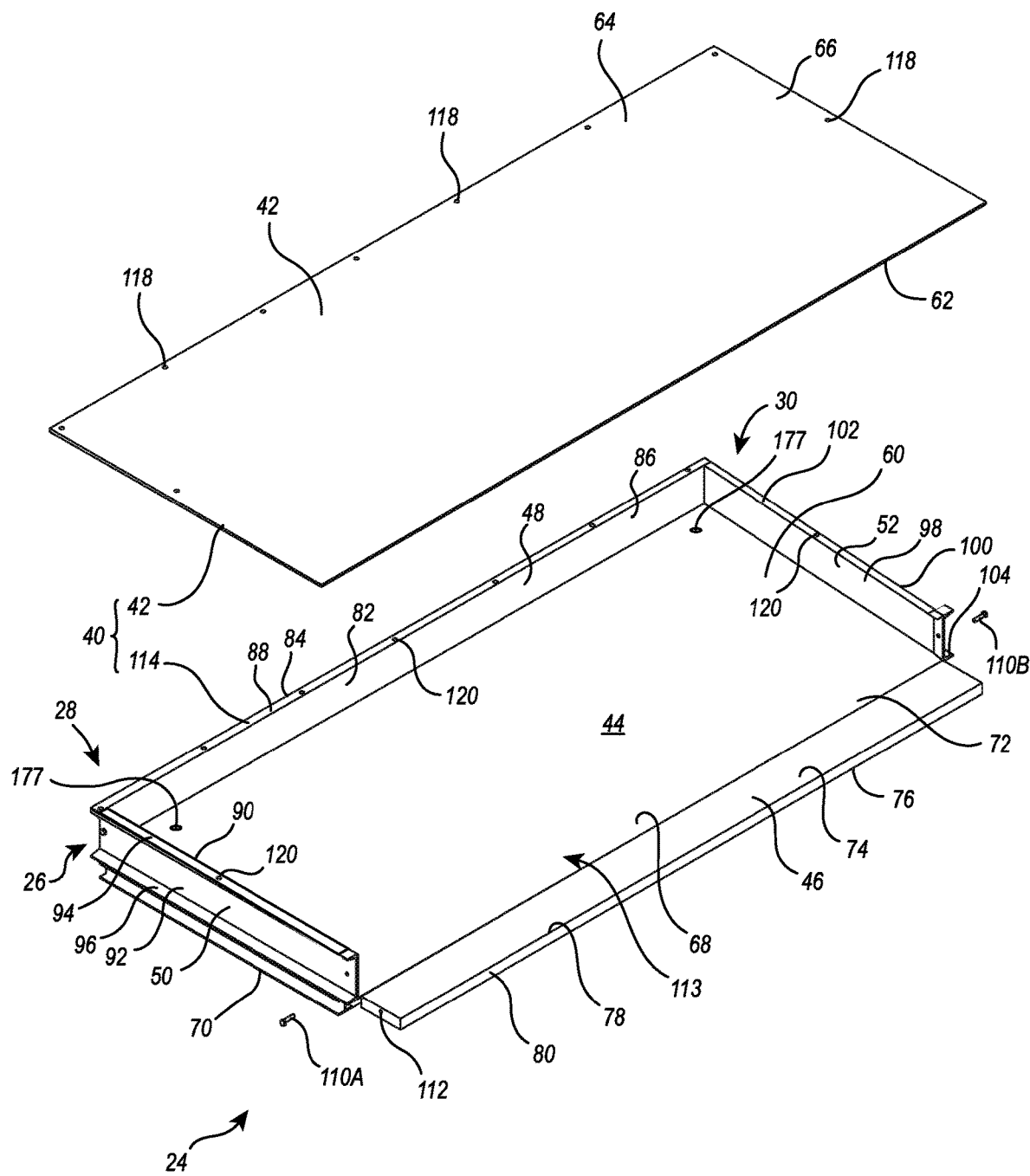
FIG. 5 is a partially exploded view of the body of the mold shown in FIG. 4.

As more clearly depicted in FIG. 4, the depicted embodiment of mold 12 comprises a mold body 40 that is comprised of a plurality of panels secured together. In turn, various supports can be secured to the panels of mold body 40. More specifically, as depicted in FIG. 5, mold body 40 also has a box shaped configuration that includes upper end 24 and an opposing lower end 26 and also first side end 28 and opposing second side end 30. Mold body 40 includes a front panel 42 and an opposing rear panel 44. Mold body 40 further includes a top panel 46 extending between panels 42 and 44 at upper end 24; a bottom panel 48 extending between panels 42 and 44 at lower end 26; a first side panel 50 extending between panels 42 and 44 at first end 28; and a second side panel 52 extending between panels 42 and 44 at second end 30.

Mold body 40 bounds a compartment 60 in which the barrier wall is formed. Front panel 42 has an interior surface 62 that partially bounds compartment 60, an exterior surface 64, and an encircling perimeter edge 66. Likewise, rear panel 44 has an interior surface 68 that partially bounds compartment 60, an exterior surface 70, and an encircling perimeter edge 72. Front panel 42 and rear panel 44 are each depicted as having an elongated rectangular configuration. However, other configurations, such as square, can also be used.

Top panel 46 has an interior surface 74 that partially bounds compartment 60, an exterior surface 76, an encircling perimeter edge 78 and a lip 80 that outwardly projects from perimeter edge 78. Bottom panel 48 has an interior surface 82 that partially bounds compartment 60, an exterior surface 84, an encircling perimeter edge 86 and a lip 88 that outwardly projects from perimeter edge 86. First side panel 50 has an interior surface 90 that partially bounds compartment 60, an exterior surface 92, and lips 94 and 96 that outwardly projecting from opposing side edges thereof. Finally, second side panel 52 has an interior surface 98 that partially bounds compartment 60, an exterior surface 100, and lips 102 and 104 that outwardly projecting from opposing side edges thereof.

During assembly, bottom panel 48, first side panel 50 and second side panel 52 are secured to rear panel 44 along perimeter edge 72 at lower end 26, first end 28 and second end 30, respectively, so that panels 48, 50 and 52 connect together and outwardly project from interior surface 68. Panels 48, 50 and 52 can be permanently or removably attached to rear panel 44. For example, panels 48, 50 and 52 can be welded to rear panel 44 or fasteners, such as bolts, screws, rivets, or other fasteners, can be passed through lips 88, 96, and 104 and through rear panel 44 for securing. Other attachment techniques can also be used.

Because panels 42, 44, 46, 48, 50, and 52 form at least portions of walls 20, 22, 24, 26, 28, and 30, respectively, it is submitted that reference to one or more panels 42, 44, 46, 48, 50, and 52 herein also constitutes disclosure as reference to one or more corresponding walls 20, 22, 24, 26, 28, and 30 and vice versa, unless clearly indicated otherwise by the context of the disclosure. For example, reference to removal, movement or attachment of one or more panels also constitutes disclosure of removal, movement or attachment of one or more corresponding walls and vice versa. Likewise, reference to an interior surface of one or more panels also constitutes disclosure of reference to an interior surface of the one or more corresponding walls and vice versa.

Figure 7:
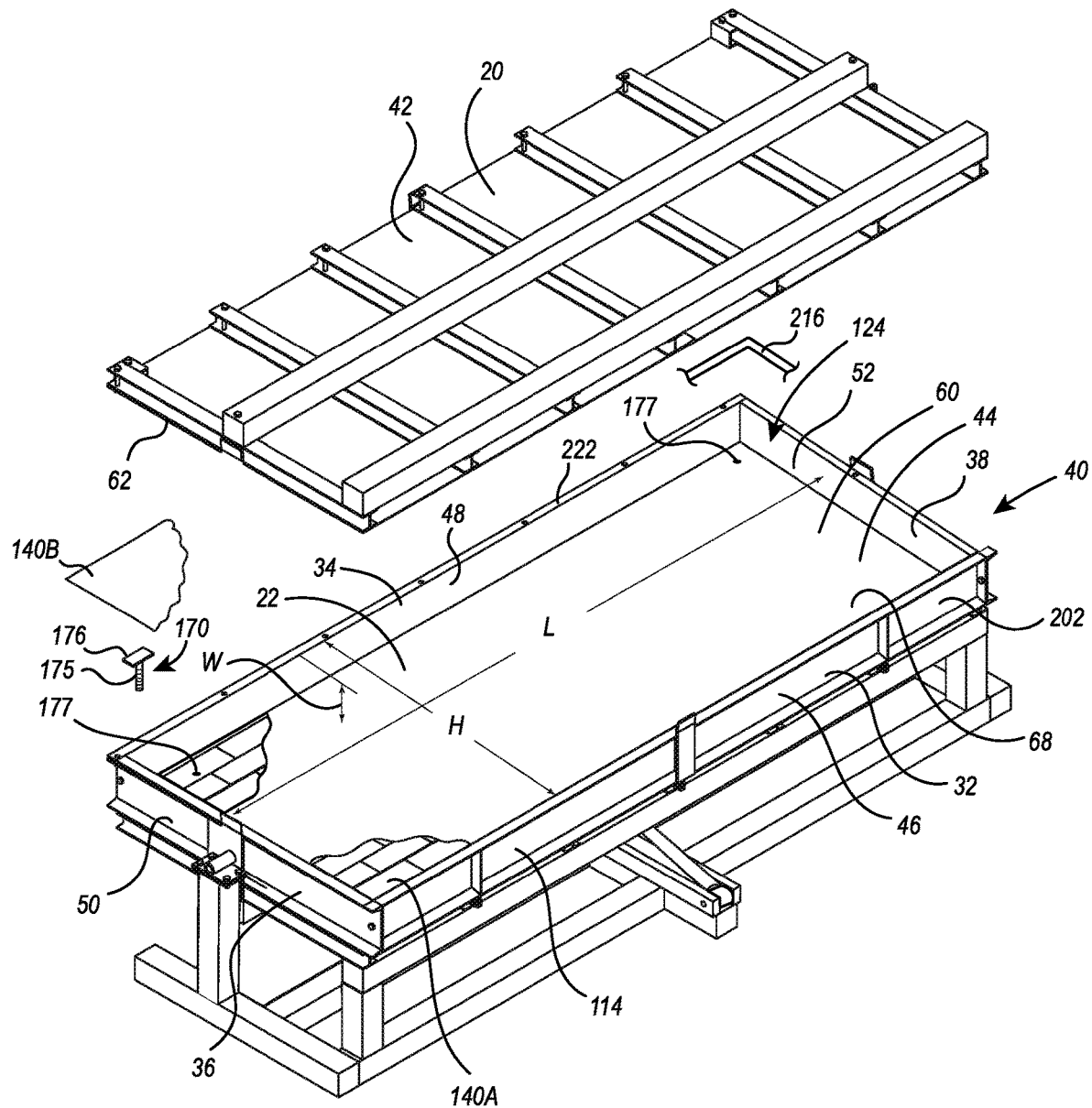
FIG. 7 is a perspective view of the form shown in FIG. 6 with the front wall of the mold being removed.
Figure 9:
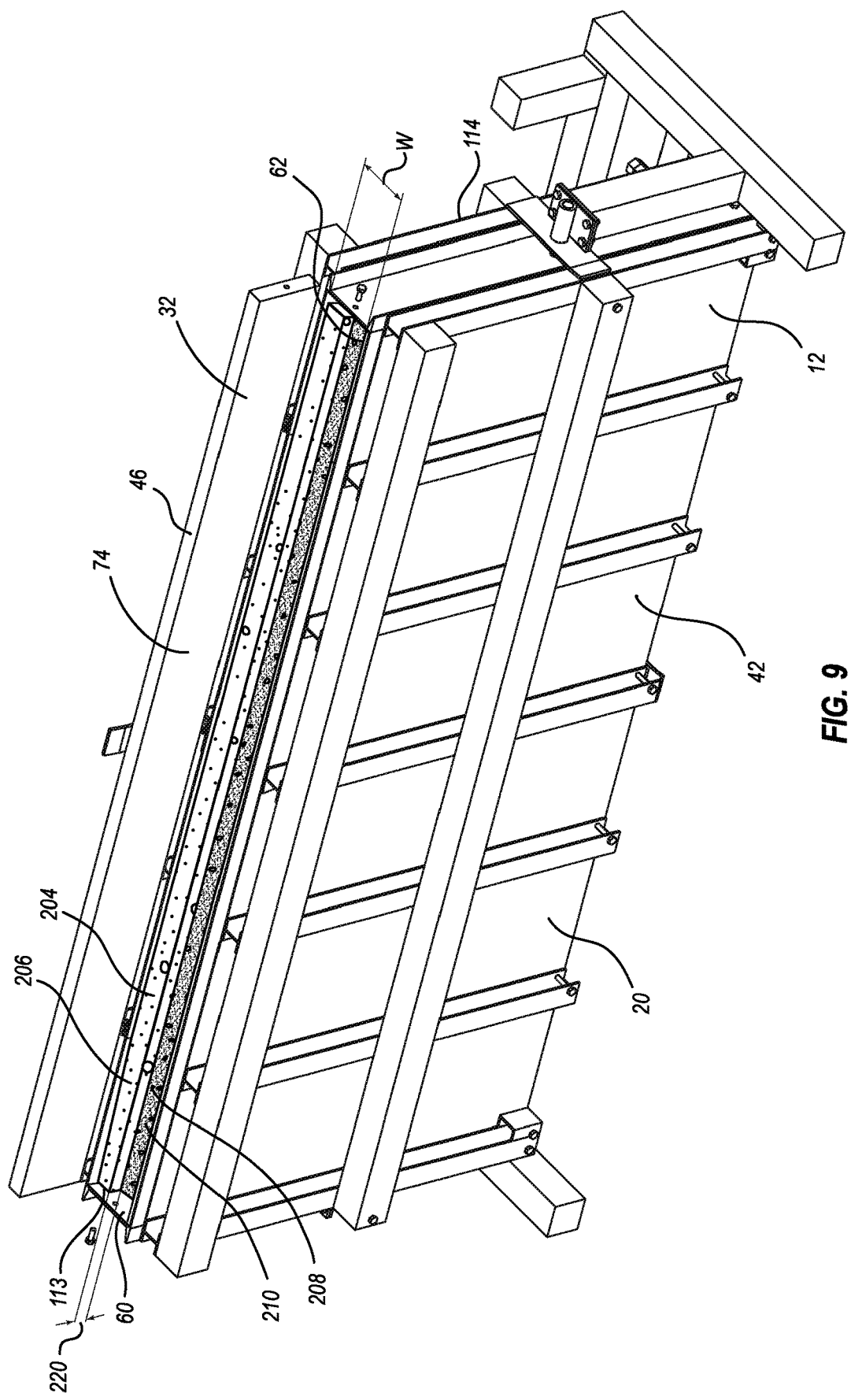
FIG. 9 is a perspective view of the form shown in FIG. 7 with the front wall of the mold replaced and the mold rotated to the vertical orientation.

Top panel 46 is also attached to rear panel 44 along perimeter edge 72 at upper end 24. However, top panel 46 is positioned to be selectively removable or movable so that compartment 60 can be accessed. For example, in the depicted embodiment as shown in FIG. 3, a plurality of spaced apart hinges 108A, 108B and 108C are used to hingedly secure an edge of top panel 46 along upper end 24 of rear panel 44. Accordingly, top panel 46 can be selectively rotated between a first or closed position as shown in FIGS. 3 and 7 and a second or open position as shown in FIGS. 5 and 9. In the closed position, top panel 46 can be secured in place by fasteners 110A and 110B (FIG. 5) passing through an opening in the end of side panels 50 and 52 and threading into openings 112 formed on lip 80 of top panel 46. Alternatively, fasteners 110A and 110B could pass through openings 112 and then be threaded into nuts. Other removable fastening techniques can also be used. To move top panel 46 to the open position, fasteners 110A and 110B are removed and top panel 46 is manually rotated about hinges 108 into the open position. When top panel 46 is in the open position, an access opening 113 (FIG. 9) is formed that communicates with compartment 60. In an alternative embodiment, top panel 46 need not be hingedly connected to rear panel 44 but can simply be removably connected to rear panel 44. For example, top panel 46 can be removably attached to rear panel 44 and side panels 50 and 52 by removable fasteners, such as bolts, screws, clamps or the like. As such, top panel 46 can be completely removed from panels 44, 50 and 52 to expose access opening 113 and can be selectively reattached to cove access opening 113.

The assembled rear panel 44, top panel 46, bottom panel 48 and side panels 50 and 52 combined to form a base 114 of mold body 40. As used herein, base 114 can also reference the assembled rear wall 22, top wall 32, bottom wall 34, first side wall 36 and second side wall 38 of mold 12 as shown in FIG. 7. Base 114 is configured so that front panel 42/front wall 20 can be selectively attached and removed from base 114. For example, openings 118 extends through perimeter edge 66 of front panel 42 and match with openings 120 formed lips 88, 94, and 102 on panels 48, 50, and 52, respectively. Accordingly, by position front panel 42/front wall 20 on panels 48, 50, and 52, fasteners 122 (FIG. 2) can be passed through or threaded into openings 118 and 120 for removably securing front panel 42/front wall 20 to base 114 of mold 12. It is also appreciated that nuts can be used with fasteners 112 for securing in place. Other conventional fasteners and fastening techniques can also be used.

Figure 6:
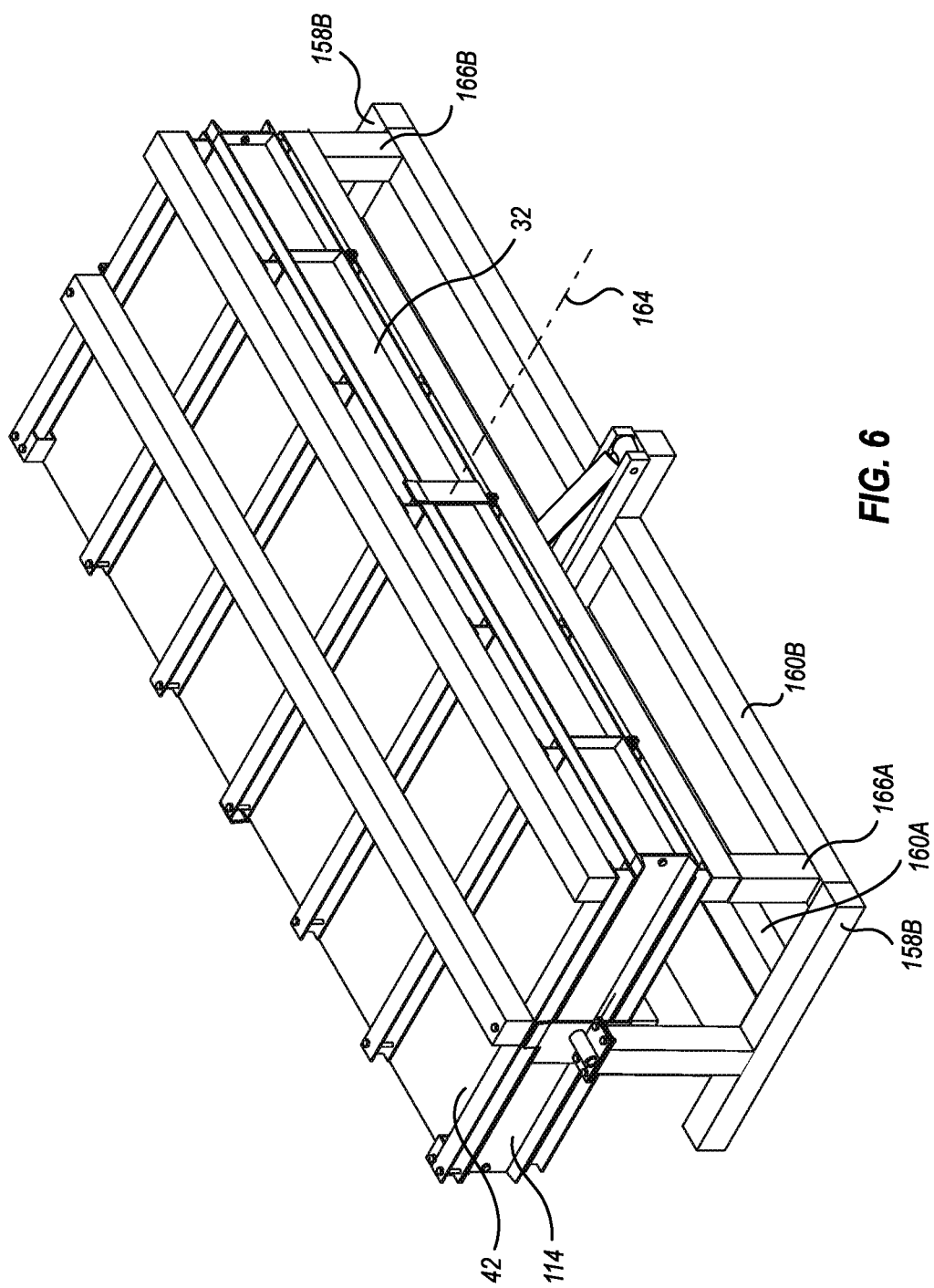
FIG. 6 is a front perspective view of the form shown in FIG. 1 with the mold thereof rotated to a horizontal orientation.

By using fasteners 112, front panel 42 can be selectively moved to a first or closed position, as depicted in FIGS. 2 and 6, where front panel 42 is secured to base 114 of mold body 40 and assists in enclosing compartment 60. Front panel 42 can also be selectively moved to a second or open position, as depicted in FIG. 7, where front panel 42 is removed from base 114 of mold body 40 so that an access opening 124 to compartment 60 is exposed. Access opening 124 is covered by front panel 42 when front panel 42 is in the first or closed position. In contrast to being fully removable from base 114 of mold body 40, front panel 42 could also be hingedly attached to base 114, such as along bottom panel 48. In this configuration, front panel 42 can still be selectively moved between the open and closed positions relative to base 114.

The panels of mold body 40 are typically formed of a metal plate such as steel or aluminum. However, in other embodiments, the panels can be made of wood, plastic fiberglass, composite or other materials. To increase the structural stability of the panels and prevent unwanted bending, support members can be secured to front panel 42 and rear panel 44. Specifically, as depicted in FIGS. 3 and 4, a plurality of elongated supports 130A-130G are secured to exterior surface 70 of rear panel 44 at spaced apart locations so as to extend between upper end 24 and lower end 26. Supports 130 can be secured to rear panel 44 by welding, adhesive, or using fasteners such as screw or bolts. Other securing techniques can also be used. Supports 130 are typically in the form of channel beams or I-beams that are formed of metal. However, other shaped beams can be used and they can be made of other material such was wood, plastic, fiberglass, composite or the like. The number of supports 130 used depends on the size of rear panel 44. Typically, however, the number of supports 130 used is at least or not to exceed 2, 3, 4, 6, 8, 10 or is in a range between any two of the foregoing. Rear panel 44 and supports 130 can combine to form rear wall 22, previously discussed.

By using the combination of rear panel 44 and supports 130, rear panel 44 can be made thinner, thereby decreasing cost and weight, yet the overall rear wall 22 can still have the desired strength and stiffness. In other embodiments, however, rear wall 22 can be formed by eliminating supports 130 and simply increasing the thickness of rear panel 44. In still other embodiments, rear wall 22 can be formed by forming rear panel 44 so that ribs or other support structures are integrally formed therein so as to increase the strength and stiffness of rear panel 44.

To further increase the strength and stiffness of rear wall 22/rear panel 44, rear wall 22 can also include one or more further supports 132 secured to rear panel 44 and extending between first end 28 and opposing second end 30 so as to be positioned over supports 130A-G. In the depicted embodiment, a support 132A centrally extends over supports 130 while a support 132B extends over supports 130 at upper end 24. Supports 132 can have the same alternative configurations as supports 130. Other numbers and orientations of supports 132 can also be used.

The configuration of front wall 20 can be the same as and have the same alternatives as rear wall 22. As such, all of the above discussion of rear wall 22 is also applicable to front wall 20. For example, as with rear wall 22, front wall 20 can comprise front panel 42 having a plurality of supports 134A-G (which correspond to supports 130A-G) secured to exterior surface 74 at spaced apart locations so as to extend between upper end 24 and lower end 26. Again, the attachment method, number, configuration, and purpose of supports 134A-G can be the same as discussed above with regard to supports 130A-G. Likewise, to further increase the strength and stiffness of front wall 20, one or more further support 136 can be secured to front panel 42 extending between first end 28 and opposing second end 30 so as to be positioned over supports 134A-G. In the depicted embodiment, a support 136A centrally extends over supports 134 while a support 136B extends over supports 134 at upper end 24. Supports 136 can have the same alternative configurations as supports 134. Other numbers and orientations of supports 136 can also be used.

With reference to FIG. 3, a brace 150A is centrally mounted on the exterior surface of first sidewall 36. As will be discussed below in greater detail, outwardly projecting from brace 150A is an axle 152A. In this embodiment, axle 152A is positioned so as to be centrally disposed relative to both the height and width of first sidewall 36. With reference to FIG. 2 a corresponding brace 150B is also secured on the exterior surface of second sidewall 38 with an axle 152B outwardly projecting therefrom. Axle 152B is also positioned so as to be centrally disposed relative to both the height and width of second sidewall 38. As a result, axles 152A and 152B are disposed along a common axis 154.

In general, the size of mold 12 is dependent upon the size of barrier wall to be manufactured. With reference to FIG. 7, compartment 60 has a height H extending between the interior surfaces of top panel 46 and bottom panel 48; a length L extending between the interior surfaces of side panels 50 and 52; and a width W extending between the interior surfaces of front panel 42 and rear panel 44. In some embodiments, the height H is at least 0.75, 1, 1.2, 1.5, 1.8, 2, 2.5, 3, or 4 meters or is in a range between any two of the foregoing. The length L is at least 1, 1.5, 2, 2.5, 3, 3.5, 4, 5 or 6 meters or is in a range between any two of the foregoing. The width W is typically less than 0.7, 0.5, 0.3, 0.2, 0.1 or 0.07 meters or is in a range between any two of the foregoing. In one embodiment, the height H and the length L are greater than the width W by a factor of at least 2, 3, 4, 6, 8, 10, 12, 15, or 20. In another embodiment, the length L is greater than the width W by a factor of at least 1.2, 1.5, 1.75, 2, 2.5 or 3. Other ratios can also be used. In each of the foregoing examples, the referenced height H, length L, and width W can correspond a maximum or a minimum height H, length L or width W. Compartment 60 typically has a volume of at least or less than 0.2, 0.3, 0.5, 0.6, 0.8, 1, 1.2, 1.5, 1.8, 2, 2.5, 3, or 4 cubic meters ($m^3$) or can be in a range between any two of the foregoing.

In one embodiment, compartment 60 can be a cuboid so that all opposing surfaces are parallel. However, in alternative embodiments, the interior surfaces of front panel 42 and rear panel 44 and/or the interior surfaces of top panel 48 and bottom panel 50, and/or the interior surfaces of side panel 50 and side panel 52 can be disposed in converging or diverging planes or one of the opposing panels can be angled relative to the other. The resulting barrier wall can then then having corresponding opposing surfaces.

In another alternative embodiment, it is appreciated that each of some of the interior surfaces of mold body 40 bounding compartment 60 need not be flat but can be contoured with a design or texture. This can be accomplished by forming a desired contour of a design or texture directly on the interior surface of each panel or, alternatively a liner can be attached to one or more of the interior surfaces of each of the panels, each liner having the desired contour of a design or texture formed thereon. For example, as depicted in FIG. 7, a liner 140A can be secured to or positioned against interior surface 68 of rear panel 44 while a liner 140B can be secured to or positioned against interior surface 62 of front panel 42. The contours on the interior surface of the panels or liners could be in the shape of rocks, blocks, bricks, columns, or other shapes that are recessed into or outwardly project from the panels or liners. As discussed below in more detail, these contours of design or texture are transferred to the exterior surface of the barrier wall during the manufacturing process. The contour can be the same or different for each panel.

Figure 3A:
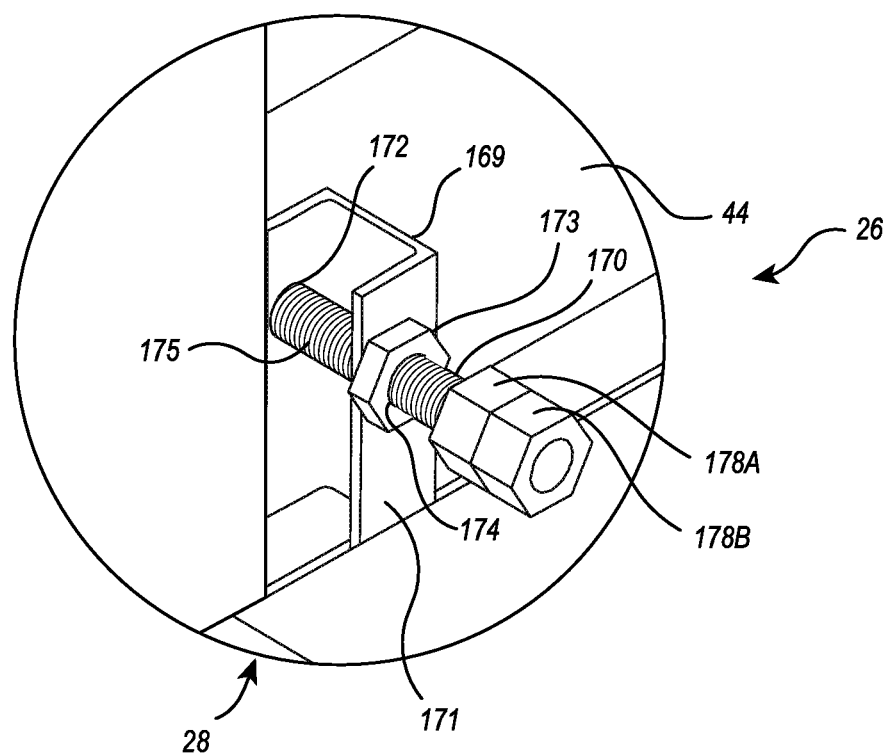
FIG. 3A is an enlarged perspective view of the extractor shown in FIG. 3.

As shown in FIGS. 3, 3A and 7, in one embodiment mold 12 can comprise extractors 168A and 168B mounted on the opposing ends of rear wall 22/rear panel 44 at lower end 26 that are used to help remove the formed barrier wall from compart 60. As depicted in FIG. 3A, extractor 168A generally comprises a base 169 having a threaded opening and a pusher 170 that is threaded into the threaded opening. More specifically, base 169 is depicted as comprising a support 171, such as in the form of a channel beam or I-beam, secured to rear panel 44 at lower end 26 and first end 28. Support 171 can be secured such as by welding or the use of fasteners. An opening 172 passes through support 170. A nut 173 having a threaded opening 174 is secured to support 170, such as by welding, so that threaded opening 174 is aligned with opening 172. In an alternative embedment, nut 173 could be eliminated and opening 172 could be threaded.

As depicted in FIG. 7, pusher 170 comprises a threaded shaft 175 having a free first end and an opposing second end having a radially outwardly projecting plate 176 mounted thereat. Plate 176 is typically mounted on shaft 175 so that shaft 175 can freely rotate independent plate 176. As also depicted in FIG. 7, a hole 177 passes through rear panel 44 in alignment with opening 172 on support 170 (FIG. 3A). Where liner 140A is disposed on interior surface 69 of rear panel 44, hole 177 also passes through liner 140A.

During assembly, the first end of threaded shaft 177 is passed through hole 177 of liner 140A and rear panel 44, through opening 172 and threaded into threaded opening 174 of nut 173. Threaded shaft 175 is advanced until plate 176 is flush against liner 140A or flush against rear panel 44 where liner 140A is not used. As depicted in FIG. 3A, nuts 178A and 178B are then threaded onto the first end of threaded shaft 175 and then tightened together so that rotation of nut 178B causes rotation of threaded shaft 175.

In this assembled condition, as discussed below in greater detail, once the barrier wall is formed and ready to be removed from mold 12, front wall 20 is removed from mold 12. Pusher 170 can then be advanced into compartment 60 by using a wrench or other tool to rotate nut 178B so as to rotate threaded shaft 175. As threaded shaft 175 is rotated, threaded shaft 175 advances into compartment 60. In turn, plate 176 pushes against the formed barrier wall and assists to both separate the barrier wall from liner 140A and to push the barrier wall out of compartment 60. Extractor 168B has the same elements and is used in the same way as extractor 168A. As such, like elements between extractor 168A and 168B are identified by like reference characters. The only difference is that extractor 168B is located on lower end 26 of rear panel 44 at second end 30.

In some embodiments, it is appreciated that mold 12 can be formed so that compartment 60 has a uniform and constant width W over the entire length L and height H. In other embodiments, although the width W may be constant over a majority of the length L or height H, the width W may taper, expand or have other configurations adjacent to panels 46, 48, 50 and/or 52. In still other embodiments, the width W, length L and/or height H can each vary or be constant, as desired.

Turning to FIG. 3, stand 14 comprises a base 142 and a pair of spaced apart risers 144A and 144B upstanding therefrom. Risers 144A and 144B each have a lower end 146 and an opposing upper end 148. Disposed at upper end 148 of each riser 144A and 144B is a shaft support 156A and 156B, respectively, that is configured to receive and support axles 152A and 152B, respectively, so that axles 152 can freely rotate therein. Shaft support 156 can comprise any structure or surface that can receive and retain axles 152 and permit the rotation of axles 152. For example, shaft supports 156 can comprise tubular members, U-shaped members, or other structures. In one embodiment, each shaft support 156 comprises a tubular bearing housing 157 in which an annular bearing is disposed. Axles 152 are received within bearing housing 157 so as to ride on the bearings during rotation. However, it is not required that a bearing be used.

Base 142 includes a support foot 158A and 158B disposed at lower end 146 of risers 144A and 144B, respectively, for resting on a ground surface. A pair of spaced apart, elongated braces 160A and 160B extend between feet 158A and 158B. In other embodiment, a single brace or three of more braces can be used.

During assembly, axles 152 of mold 12 are received within shaft supports 156 so that mold 12 is fully supported on risers 144 of stand 14. In this position, mold 12 is also rotatable relative to stand 14 by axles 152 rotating within shaft supports 156. Mold 12 can typically be rotated over an angle of at least 90° between a first or horizontal orientation as shown in FIG. 6 and a second or vertical orientation as shown in FIGS. 1 and 2. That is, mold 12 can include an axis 164 that passes between top wall 32 and bottom wall 34. Axis 164 can be disposed to pass centrally through compartment 60 (FIG. 7) relative to both length L and width W. In FIGS. 1 and 2, with mold 12 in the vertical orientation, axis 164 is vertically orientated while in FIG. 6 with mold in the horizontal orientation, axis 164 is horizontally disposed. In some embodiments, however, it is not necessary that that axis 164 be exactly vertically and horizontally disposed. For example, in the vertical orientation, axis 164 could be in a range of +/−15°, 10°, 5°, or 3° relative to vertical while in the horizontal orientation, axis 164 could be in a range of +/−15°, 10°, 5°, or 3° relative to horizontal. In some embodiment, it is also appreciated that mold can rotate over an angle of at least or less than 110°, 100°, 95°, 90°, 85°, 80°, 70° or in a range between any two of the foregoing. In the depicted embodiment, mold 12 has only a single axis of rotation. That is, form 10 is configured so that mold 12 can only rotate about a single axis.

Because axles 152 are centrally or symmetrically located on side walls 36 and 38 relative to the height and width of mold 12, mold 12 is centrally balanced on risers 144, thereby making it easier to rotate mold 12 between the vertical and horizontal orientations. However, it is also envisioned that axles 152 could be asymmetrically positioned on side walls 36 and 36 such as by being positioned toward or directly on front wall 20 or rear wall 22 and/or positioned toward or directly on top wall 32 or bottom wall 34. It is also appreciated that axles 152 and shaft supports 156 can be switched. That is, shaft supports 156 can be secured to mold 12 while axles 152 can be secured to risers 144.

As depicted in FIGS. 3 and 6, rests 166A and 166B can be secured to base 142 at opposing ends of stand 14 so as to upstand therefrom. Rests 166 are configured so that when mold 12 is in the horizontal orientation, upper end 24 of mold is supported by sitting on top of rests 166. Rest 166 can thus be used to both support mold 12, i.e., carry part of the weight thereof, and ensure that mold 12 is rotated to the desired orientation. That is, mold 12 is rotated until mold 12 comes to rest on rests 166. In an alternative embodiment, rests 166 could be secured to upper end 24 of mold 12 at the opposing ends thereof. During use, rests 166 would then come to rest on base 142 and/or on a ground surface when mold 12 is moved to the horizontal orientation. Although two rests are shown, the system can be formed with a single rest 166 located at one end or more centrally, or could be formed with three or more spaced apart rests 166. In other embodiments, rests 166 are not required.

One embodiment of the present invention includes means for selectively rotating mold 12 between the first/horizontal orientation and the second/vertical orientation. Such means can be coupled to mold 12 and/or stand 14 or extend therebetween. By way of example and not by limitation, depicted in FIG. 1 is expansion cylinder 16, which can be a pneumatic or hydraulic cylinder. Expansion cylinder 16 has a first end 180 that is hingedly coupled with stand 14 and an opposing second end 182 that is hingedly coupled to mold 12. More specifically, with reference to FIG. 3, expansion cylinder 16 includes a cylinder body 184 having first end 180 and a piston rod 186 that is slidably received within cylinder body 184 and includes second end 182. A pair of rails 188A and 188B are centrally mounted on base 142 of stand 14 and bound a channel 190 therebetween. Channel 190 is sized so that at least portion of expansion cylinder 16, and in some embodiments all of expansion cylinder 16, can be received within channel 190. First end 180 is received within channel 190 while a bolt 192 is secured to rails 188 and passes through first end 180. First end 180 pivots about bolt 192. A pair of arms 194A and 194B project from rear wall 22 of mold 12 at or toward lower end 26, i.e., below axis 154 (FIG. 2). Second end 182 is received between arms 194 while a bolt 196 (FIG. 1) is secured to arms 194 and passes through second end 182. Second end 182 pivots about bolt 196.

An actuator 200 is provided with a pair of fluid lines 202A and 202B that extend from actuator 200 to the opposing ends of cylinder body 184. Actuator 200 can comprise a pump for delivering hydraulic fluid in and out of the opposing ends of cylinder body 184 or a compressor for delivering compressed gas into and out of the opposing ends of cylinder body 184. As is known in the art, delivering hydraulic fluid or compressed gas into and out of cylinder body 184 selectively moves piston rod 184 into and out of cylinder body 184. Accordingly, by selectively operating actuator 200, expansion cylinder 16 can be moved between a collapsed position and an expanded position. As expansion cylinder 16 is moved to the collapsed position, as shown in FIGS. 1-3, expansion cylinder 16 causes mold 12 to rotate into the second/vertical orientation. In turn, as expansion cylinder 16 is moved to the expanded position, as shown in FIGS. 6 and 7, expansion cylinder 16 causes mold 12 to rotate into the first/horizontal orientation. Actuator 200 and expansion cylinder 16 can also be used for securely holding mold 12 in the second/vertical orientation and the first/horizontal orientation. In addition, actuator 200 and expansion cylinder 16 can also be used for securely holding mold 12 at any desired angle of orientation between the second/vertical orientation and the first/horizontal orientation.

Although the depicted embodiment shows the use of a single expansion cylinder 16 located centrally on mold 12 and base 142, in other embodiments, expansion cylinder 16 can be located at or toward first end 28 or second end 30 or two or more spaced apart expansion cylinders 16 can be used. Furthermore, in contrast to second end 182 being connected at or toward lower end 26 of mold 12, second end 182 could be connected at or toward upper end 24 of mold 12, i.e., above axis 154 (FIG. 2), and still facilitate rotation of mold 12.

In other embodiments of the means for selectively rotating mold 12 between the first/horizontal orientation and the second/vertical orientation, expansion cylinder 16 could be replaced with other mechanical devices that can be used for rotating mold 12. For example, cable, chain, or gear assemblies operating with one or more electrical motors can be used to selectively rotate mold 12. Other conventional techniques can also be used.

In other embodiments of the present invention, expansion cylinder 16 can be eliminated and mold 12 can be rotated manually, such as through the use of a lever. Furthermore, an apparatus that is not connected to mold 12 or stand 14, such as a backhoe, can be used to rotate mold 12.

During use, mold 12 is initially rotated to the first/horizontal orientation, as depicted in FIG. 7, such as through the use of expansion cylinder 16. Mold 12 is securely held in the first/horizontal orientation, such as through expansion cylinder 16 or by using a separate locking feature. Either prior to or after mold 12 is rotated to the first/horizontal orientation, front wall 20/front panel 42 is removed from or rotated on base 114 of mold 12 so that access opening 124 to compartment 60 is openly exposed. In this position, panels 46, 48, 50 and 52 are upstanding from rear panel 44 and combine to form a sidewall 202 that encircles compartment 60. Expressed in other terms, top wall 32, bottom wall 34, first sidewall 36 and second side wall 38 are upstanding from rear wall 22 and likewise combine to form a sidewall 202 that encircles compartment 60.

Figure 8:
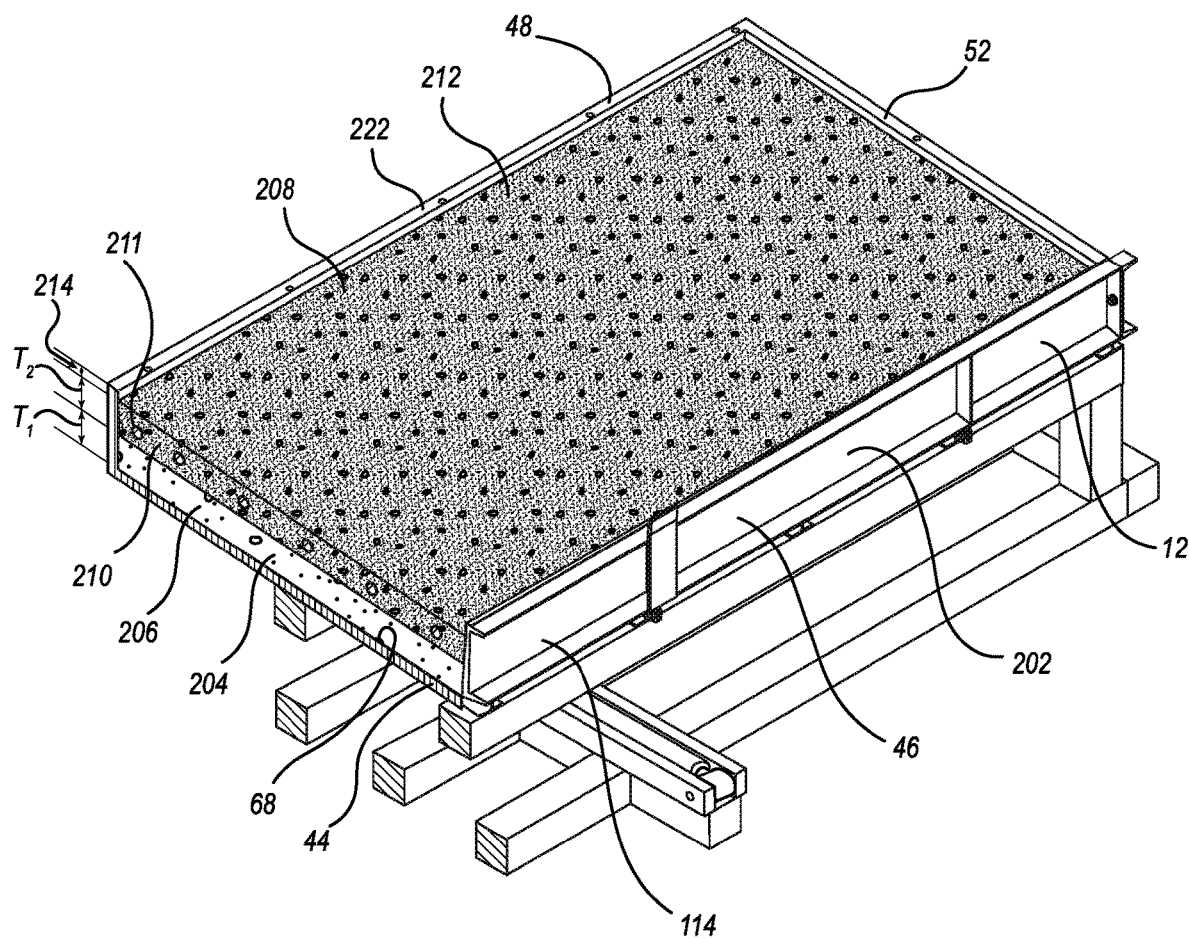
FIG. 8 is a perspective view of the form shown in FIG. 7 with a noise absorbing material and a cementitious material disposed within the compartment of the mold.

Next, as depicted in FIG. 8, a noise absorbing material 204 is deposited within compartment 60 so as to rest on interior surface 68 of rear panel 44/rear wall 22. Noise absorbing material is a material that has enhanced sound dampening or noise absorbing qualities. In one embodiment, noise absorbing material 204 can comprise a curable material that is mixed together, placed and then left to cure. Most commonly, noise absorbing material 204 comprises a noise absorbing component that is mixed with hydraulic cement and water. The noise absorbing component will commonly comprise natural rubber, synthetic rubber, wood, or polymeric foam that is ground, shred or otherwise formed into small pieces typically having an average diameter that is less than 4 cm, 3 cm, 2 cm, 1 cm, 0.5 cm, 0.2 cm or is in a range between any two of the foregoing. Other soft or resiliently compressible materials having noise absorbing properties can also be used as the noise absorbing components. Combinations of the foregoing materials can also be used. In addition to the noise absorbing component, hydraulic cement and water, noise absorbing material 204 can commonly comprise lightweight aggregate. Lightweight aggregate includes aggregate meeting the requirements of ASTM C 330 with bulk density less than 70 lb/ft³ (1120 kg/m³) for fine aggregate and less than 55 lb/ft³ (880 kg/m³) for coarse aggregate. Lightweight aggregate can comprise aggregates comprised of blast-furnace slag, clay, fly ash, shale, or slate that are prepared by expanding, pelletizing, or sintering, and can comprise aggregates prepared by processing natural materials such as pumice, scoria or tuff. Noise absorbing material 204 can also comprise other additives such as an air-entraining admixture (AEA). Other additives can also be added.

Noise absorbing material 204 typically has a very low slump or no slump when first formed and is not self-leveling. During the formation of the barrier wall, noise absorbing material 204 is deposited on interior surface 68 of rear panel 44/rear wall 22 and then spread to form layer 206. Commonly, noise absorbing material 204 is tamped flat against liner 140A or interior surface 68 to form layer 206. By tamping noise absorbing material 204 against liner 140, the outside face of layer 206 contours to or imprints the texture of liner 140A. Tamping also increases the density and structural strength of layer 206.

Layer 206 can extend to encircling sidewall 202 so as to completely cover interior surface 68 of rear panel 44/rear wall 22 within compartment 60. However, in other embodiments, layer 206 need not cover all of rear panel 44 and can be spaced apart from sidewall 202 at some or all locations. For example, partitions can be disposed on rear panel 44 for controlling the layout of noise absorbing material 204. Furthermore, depending on the configuration of interior surface 68 of rear panel 44, layer 206 can have a uniform thickness or a variable thickness. For example, if contours of designs or texture are formed on interior surface 68 of rear panel 44 or on the interior surface of liner 140 (FIG. 7) positioned on interior surface 68 of rear panel 44, layer 206 can have a corresponding variable thickness. Typically, layer 206 will have a thickness $T_1$ that is at least or less than 1, 3, 5, 7, 10, 15, 20, 30, or 40 cm or in a range between any two of the foregoing. The above values for thickness $T_1$ can be maximum values or minimum values for the thickness $T_1$. Other values can also be used.

After noise absorbing material 204 is properly positioned to form layer 206, a cementitious material 208 is placed on top of layer 206. Cementitious material 208 comprises hydraulic cement, aggregate and water. Other fillers and/or additives, such as fibers, hardener, plasticizer, air-entraining admixture (AEA), color, or combinations of the forgoing can be added. In one embodiment, cementitious material 208 comprises a self-consolidating concrete (SCC). Self-consolidating concrete is a highly flowable, non-segregating concrete that spreads to fill a space without any mechanical vibration. Even if not a self-consolidating concrete, cementitious material 208, when first mixed, is typically designed to be highly flowable so as to be self-leveling.

Noise absorbing material 204 typically has a relatively low strength and thus is either not independently self-supporting as a wall structure or will fail under unacceptably low loads or forces. Cementitious material 208, when hardened, has a higher compressive strength, tensile strength, and/or density than noise absorbing material 204 when hardened but has lower noise absorbing properties than noise absorbing material 204. In one embodiment, cementitious material 208, when hardened, can have a compressive strength, tensile strength, and/or density that is at least 1.5, 2, 3, 4, 5, 6 or 7 time greater than that of noise absorbing material 204 when hardened. Accordingly, cementitious material 208 acts as a supporting structure for noise absorbing material 204 so that noise absorbing material 204 can be held and supported in the form of a wall. One of the benefits of having both noise absorbing material 204 and cementitious material 208 include a hydraulic cement is that the materials easily bond together during the curing stage so that cementitious material 208 can effectively support noise absorbing material 204. Noise absorbing material 204, when hardened, is typically at least 1.5, 2, 2.5, 3, 4, or 5 times more effective at absorbing noise than cementitious material 208, when hardened.

During application, cementitious material 208 is typically deposited as a layer 210 formed on top of layer 206. Again, this is typically accomplished by simply pouring cementitious material 208 which is highly flowable so that it self levels into layer 210. Layer 210 typically extends to encircling sidewall 202 so as to completely cover and bond to layer 206. Where portions of rear panel 44 are not covered by layer 206, portions of layer 210 could extend to rear panel 44 or liner 140 disposed thereon. As such, layer 210 can have a uniform thickness or variable thickness. Typically, layer 210 will have a thickness $T_2$ that is at least or less than 3, 5, 7, 10, 15, 20, 30, or 40 cm or in a range between any two of the foregoing. The above values for thickness $T_2$ can be maximum values for minimum values. Other values can also be used. Commonly, $T_2$ will have a thickness that is at least 1 cm, 2 cm 3 cm, 5 cm, 7 cm or 10 cm greater than the thickness of $T_1$. To further increase the strength of layer 210, reinforcing 211, such as rebar, mesh, wire or the like, can be embedded within layer 210 using conventional techniques.

With reference to FIG. 8, layer 210 is formed so that a gap 214 will be formed between a top surface 212 of layer 210 and interior surface 62 of front panel 42/front wall 20 (FIG. 7) when front panel 42/front wall 20 is secured back onto base 114 of mold 12. The formation of gap 214 achieves a couple of benefits. Initially, the amount of cementitious material 208 needed to fill the unoccupied space of compartment 60 can be large and, due to variance in noise absorbing material 204, difficult to measure. Accordingly, if attempts are made to fill compartment 60 exactly to the top of panels 46, 48, 50 and 52, i.e., encircling sidewall 202, the process could be very slow and labor intensive by incrementally adding material 208 until the exact volume is reached. Furthermore, if too much cementitious material 208 is added, cementitious material 208 can overflow mold 12 which is both messy and wasteful.

The problem is compounded when it is desired to form a design or texture on top surface 212 of layer 210 by using liner 140B (FIG. 7) or by forming a contour of design or texture on interior surface 64 of front panel 42/front wall 20. That is, when using liner 140B or design or texture on interior surface 64 of front panel 42/front wall 20, it is impossible to know how much cementitious material 208 to add to compartment 60 since part of compartment 60 will be occupied by liner 140B or the design or texture on front panel 42. If too much cementitious material 208 is added, it can be impossible to attach front panel 42/front wall 20. As such, front panel 42/front wall 20 would then need to be moved and part of cementitious material 208 removed from compartment 60 until front panel 42/front wall 20 can be attached. In contrast, by using gap 214, which need not be a defined dimension, compartment 60 can be quickly and easily filled with cementitious material 208 without risk of overfilling, thereby increasing production time and minimizing labor and waste. Furthermore, as discussed below in more detail, even when using gap 214, transferring designs or texture from front panel 42 or liner 140B to top surface 212 of layer 210 is easily achieved.

Gap 214 is typically less than or greater than 0.5, 1, 1.5, 2, 3, 4, or 5 cm or is in a range between any two of the foregoing. Other dimensions can also be used. Because top surface 212 of layer 210 can be at least slightly irregular, the above values for gap 214 can be a maximum value or a minimum value. Gap 214 is typically formed by forming top surface 212 of layer 210 the distance of gap 214 below a top perimeter edge 222 of encircling sidewall 202 as shown in FIG. 8. Alternatively or in combination, a spacer 216, as shown in FIG. 7, can be placed between perimeter edge 222 of encircling sidewall 202 and front panel 42 so that gap 214 is formed even if cementitious material 208 is filled up to perimeter edge 222 of encircling sidewall 202. Spacer 214 can be independent of encircling sidewall 202 and front panel 42 or can be integrally formed with or otherwise secured to interior surface 62 of front panel 42 around the perimeter edge thereof.

Once layer 210 of cementitious material 208 is formed with gap 214, front wall 20/front panel 42 is secured to base 114 so as to cover access opening 124 and enclose compartment 60. Mold 12 is then rotated, such as through the use of expansion cylinder 16, to the second/vertical orientation as shown in FIG. 9. Top wall 32 is then moved so that access opening 113 to compartment 60 is exposed. As previously discussed, top wall 32 can be moved by hingedly rotating top wall 32, by completely removing top wall 32, or by otherwise moving top wall 32 to expose access opening 113. One of the unique benefits of the present invention is that as mold 12 is rotated from the first/horizontal orientation to the second/vertical orientation, cementitious material 208 will automatically downwardly flow away from top wall 32 and outwardly flow against interior surface 62 of front panel 42/front wall 20 so as to fill gap 214 without any use of mechanical vibration. Again, this is achieved in part because cementitious material 208 is formed as a highly flowable material. Thus, where liner 140B (FIG. 7) is used, cementitious material 208 will flow against the interior surface of line 140B and conform to the design or texture formed thereon. The same is true if a design or texture is formed directly on the interior surface of front panel 42/front wall 20. Accordingly, in contrast to the prior state of the art, the present invention is able to produce a noise absorbing wall where the outside face of the wall is able to achieve a formed texture having deep and realistic features as opposed to merely a shallow stamped texture. As such, the inventive noise absorbing walls have a significantly improved texture and appearance on the face relative to the prior art.

It is noted that gap 214 is typically made relatively small so that sufficient cementitious material 208 is within compartment 60 to support layer 206 against rear panel 44 as mold 12 is moved from the first/horizontal orientation to the second/vertical orientation. That is, cementitious material 208 helps to prevent the collapse of layer 206.

Figure 10:
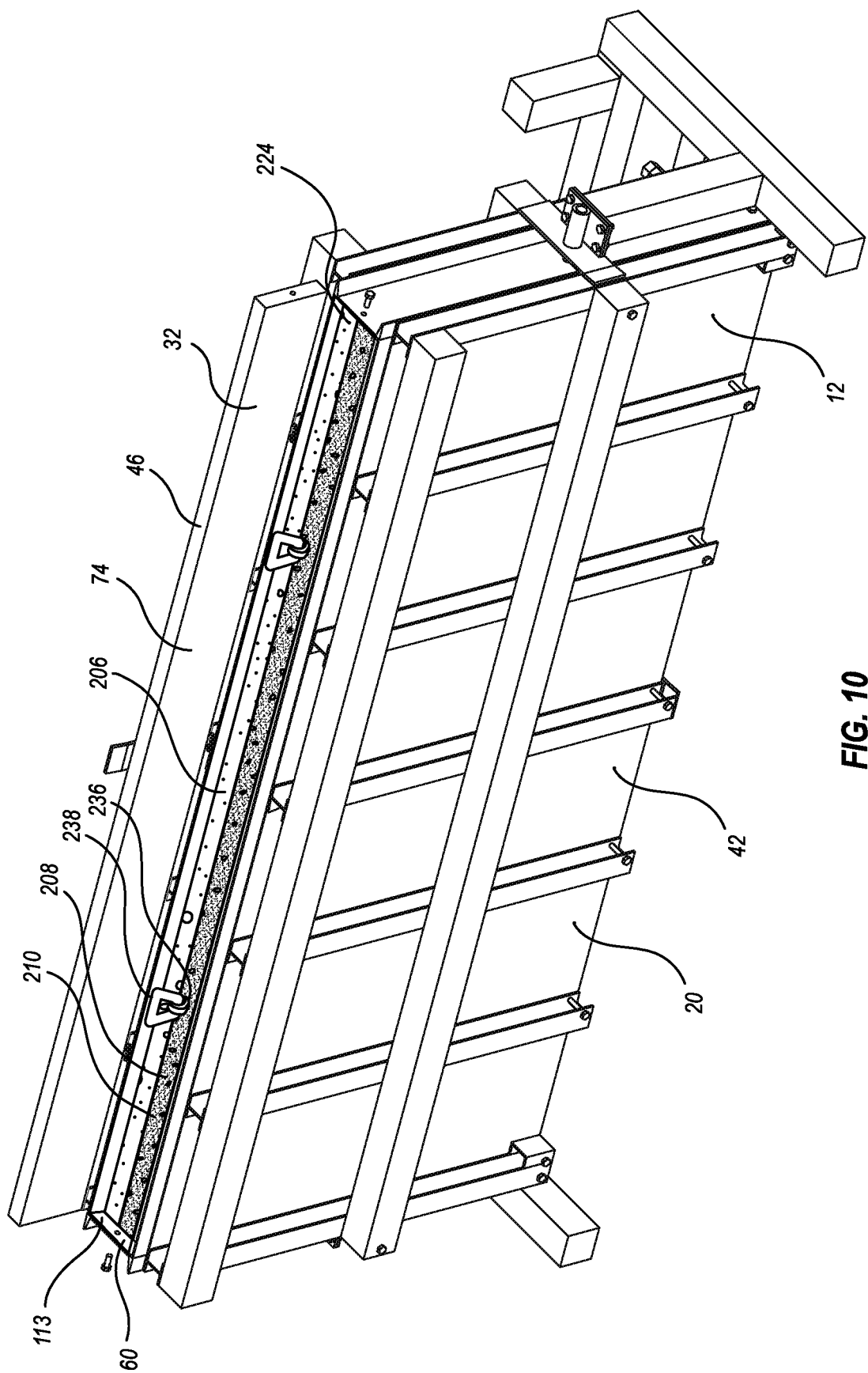
FIG. 10 is a perspective view of the form shown in FIG. 9 with an additional layer of cementitious material deposited within the compartment.

Because noise absorbing material 204 is stiff and compacted, there will typically be no slumping or movement of layer 206 as mold 12 is rotated from the horizontal position to the vertical position. However, because of the down and outward flow of cementitious material 208 into gap 214, a new gap 220 (FIG. 9) is now formed between the new top surface of cementitious material 208 and interior surface 74 of top panel 46/top wall 32 when top panel 46/top wall 32 is in the closed position. However, gap 220 can be easily filled by simply pouring more cementitious material 208 into the area of gap 220 through expose access opening 113 as shown in FIG. 10. If any downward slumping of layer 206 occurs, that gap can also be filled with cementitious material 208.

Prior to or after filling gap 220, lifting anchors 234A and 234B (FIG. 10) are inserted through access opening 113 into uncured layer 210 of cementitious material 208 toward the opposing ends thereof. Each lifting anchor 234 comprises an elongated body 236 that extends down into layer 210 so that lifting anchors 234 are securely held by layer 210 when layer 210 has cured. Lifting anchors 234 also comprise a coupling head 238 that is attached to body 236 and can be easily coupled to for picking up and moving the resulting barrier wall. For example, coupling head 238 typically comprises a ring, loop, hook or other structure having an opening that that can be engaged by a hook mounted on a lift, such as a crane. One of the benefits of the present invention is that because top wall 32 is moved to the open position prior to the curing of layer 210, it is easy and simple to attach lifting anchors 234. Once layer 210 is complete and lifting anchors 234 are attached, cementitious material 208 and noise absorbing material 204 are allowed harden and bond together while mold 12 remains in the second/vertical orientation.

Figure 11:
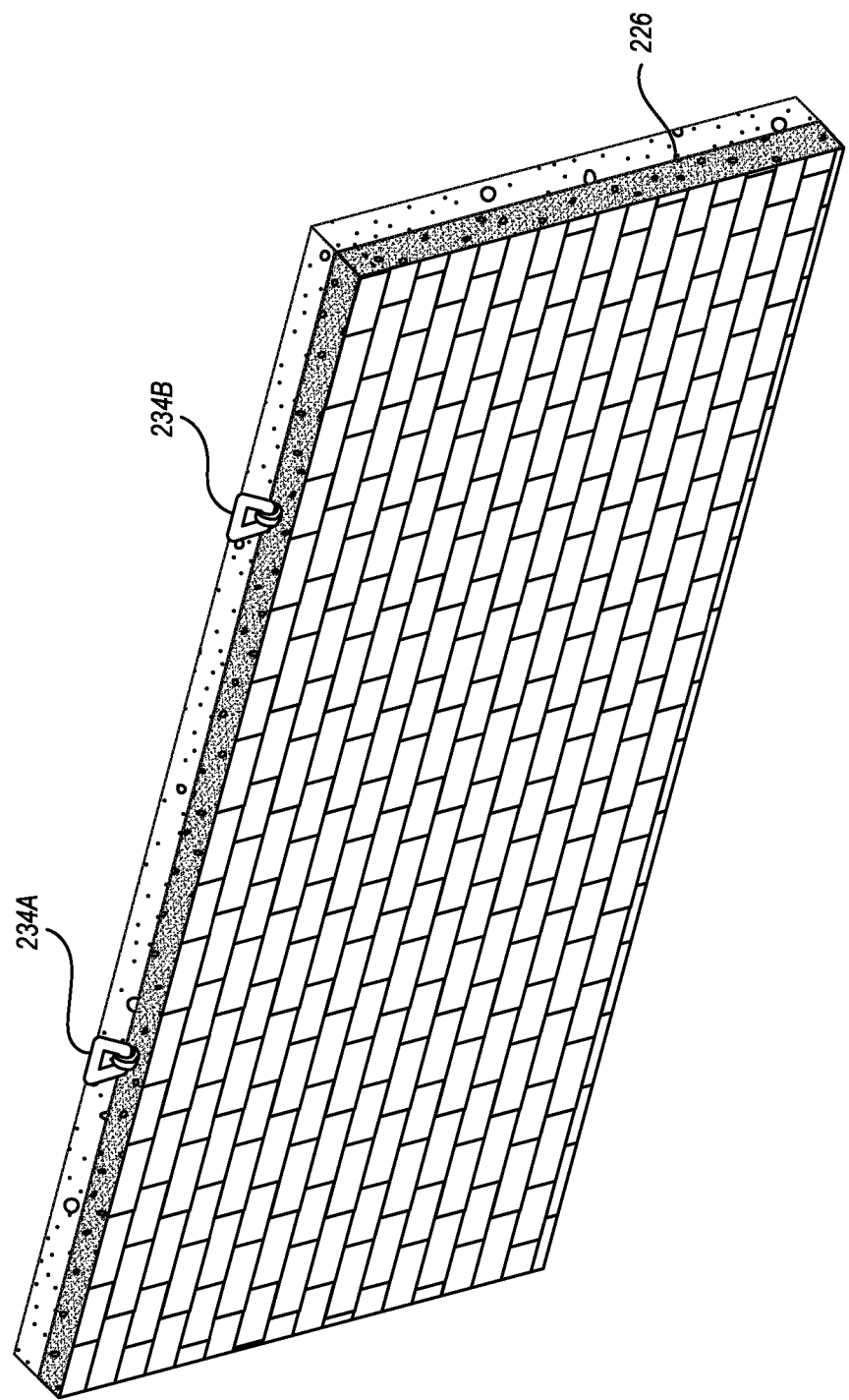
FIG. 11 is a perspective view of the hardened noise absorbing barrier wall removed from the form shown in FIG. 11.

Because mold 12 can be left in the second/vertical orientation during hardening/curing, mold 12 occupies less lateral space, thereby enabling more barriers walls to simultaneously be formed. During the hardening/curing process, top wall 32/top panel 46 can be left open as shown in FIG. 10. Once cementitious material 208 and noise absorbing material 204 sufficiently hardened/cured to form a self-supporting noise absorbing barrier wall 226, mold 12 can be opened and barrier wall 226 removed, as shown in FIG. 11. Barrier wall 226 is typically removed from mold 12 by using a lift that engages with lifting anchors 234 to support barrier wall 226. Front panel 42/front wall 20 (FIG. 10) is then removed. Extractors 168A and 168B (FIG. 3) are then used to separate barrier wall 226 from mold 12 and liner 140A (FIG. 7). The lift can then be used move barrier wall 226 to a storage location where barrier wall 226 is left in a vertical orientation while it is allowed to more completely harden/cure prior to final transport and use.

Once barrier wall 226 is removed from mold 12, the above process can then be repeated using mold 12 to form a new barrier wall 226. One of the additional benefits of the present invention is that because layers 206 and 210 are in the vertical orientation during their initial hardening/curing, barrier walls 226 can be removed relatively quickly from mold 12, thereby enabling more barrier walls 226 to be made from mold 12 for a fixed time period. That is, barrier walls 226 have more stability and structural strength in the vertical orientation than in a horizontal orientation. Thus, barrier walls 226 formed in horizontal orientation must be left to cure for a longer time period (relative to barrier walls formed in a vertical orientation) before the barrier walls can be removed from the mold and lifted to a vertical orientation for storage and further curing. For example, barrier walls 226 in a vertical orientation can typically be removed from mold 12 after 24 hours, e.g., within 25 hours of being formed. Expressed in other terms, barrier walls 226 in the vertical orientation can be cycled every 24 hours in order to form one casting per day. Commonly, vertically oriented barrier walls 226 can be removed from mold 12 within less than 26, 24, 22, or 20 hours from initial forming without failure. In contrast, barrier walls 226 formed in a horizontal orientation may require at least 30 or 48 hours of curing before they can be removed from the mold and lifted to a vertical orientation without risk of failure.

Barrier wall 226 can have the alternative sizes and configurations as previously discussed with regard to compartment 60. Likewise, barrier wall 226 can have the layers with the various configurations and dimensions of cementitious material 208 and noise absorbing material 204 as previously discussed.

Figure 12:
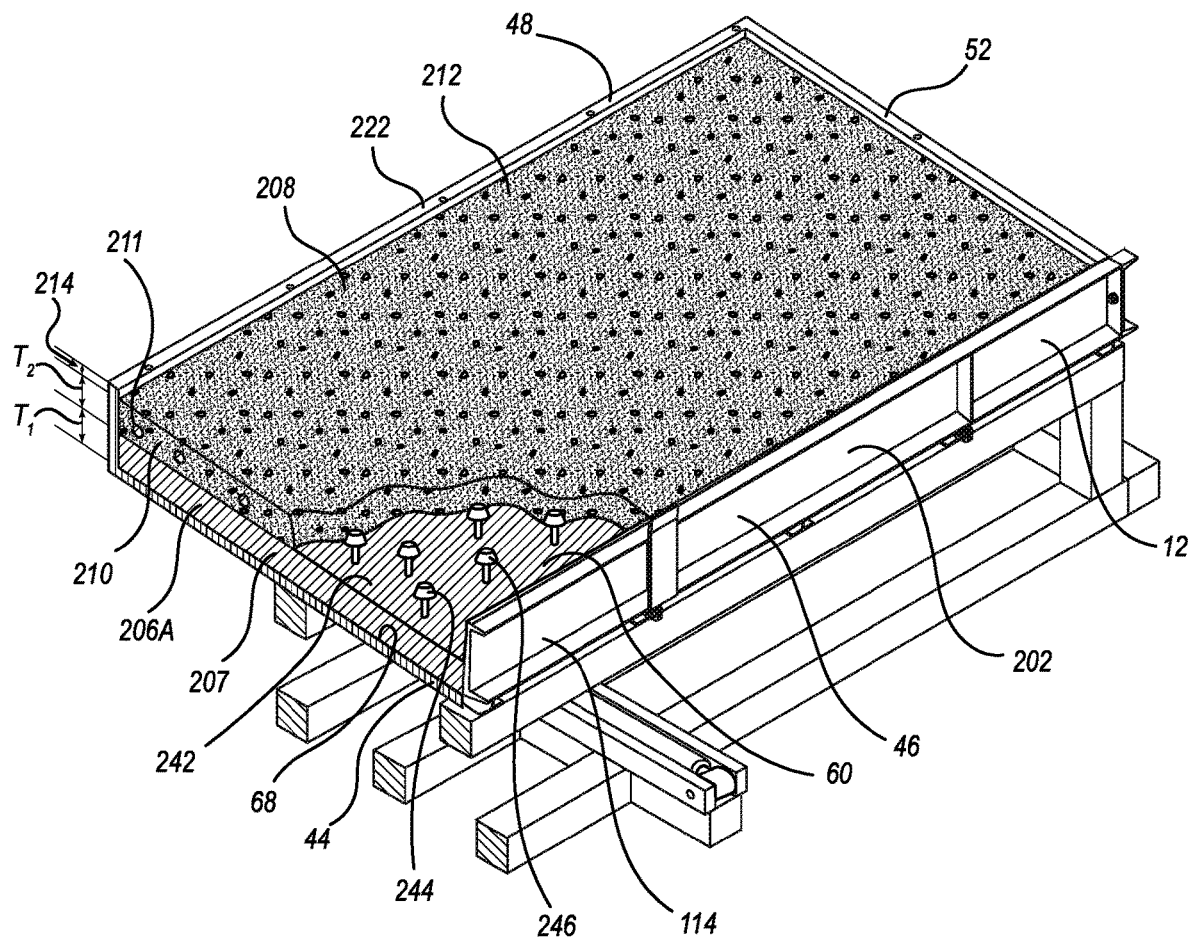
FIG. 12 is a top perspective view of the form shown in FIG. 8 with the prior noise absorbing material replaced with a prefabricated panel formed from a noise absorbing material.

FIG. 12 depicts an alternative method of forming an inventive barrier wall using mold 12. In this method, in contrast to forming layer 206 by using a curable material that is placed and leveled within mold 12, a layer 206A is first placed within mold 12 that is in the form of a prefabricated panel 207. Prefabricated panel 207 is a self-supporting structure that can be comprised of the same materials used to form noise absorbing material 204, previously discussed herein, or can comprise a wood panel, a foam panel, or a composite panel made from a combination of the forgoing materials or other materials. Prefabricated panel 207 can have the same noise absorbing properties as layer 206, i.e., can be more effective at absorbing noise than cementitious material 208. Furthermore, cementitious material 208 will typically have a higher compressive strength, tensile strength, and/or density, when cured, than prefabricated panel 207.

Prefabricated panel 207 is shown as having a top surface 242 that faces layer 210. A plurality of spaced apart anchors 244 are mounted on panel 207 so as to outwardly project from top surface 242. Anchors 244 can be mounted during the fabrication of panel 207 or can be attached after panel 207 is formed. Anchors 244 help facilitate secure engagement between panel 207 and layer 210 and can have a variety of different configurations. In the depicted embodiment, anchors 244 are formed having barbs 246.

During production, mold 12 is rotated to the horizontal orientation as shown in FIG. 12 and panel 207 is positioned within compartment 60. Cementitious material 208 is then placed on top of top surface 242 of panel 207 in the same way, as discussed above, that cementitious material was placed on top of layer 206. Anchors 244 become embedded within cementitious material 208 and facilitate a secure engagement between panel 207 and layer 210 as cementitious material subsequently hardens/cures. The same above process for forming barrier wall 226 is then continued to form a resulting barrier wall that includes panel 207. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A form for forming a barrier wall, the form comprising:
    a mold bounding a compartment having a volume of at least 0.2 cubic meters (m³), the mold comprising a front panel and an opposing rear panel each having an upper end and an opposing lower end that extend between a first side and an opposing second side, the mold further comprising:
        a bottom panel extending between the lower end of the front panel and the rear panel; and
        a top panel extending between the upper end of the front panel and the rear panel;
    a stand comprising:
        an upstanding first riser, a first end of the mold being rotatably connected to the first riser; and
        an upstanding second riser, a second end of the mold that is opposite the first end being rotatably connected to the second riser, the mold being rotatably connected to the first riser and the second riser of the stand so that the mold is rotatable about an axis that laterally passes through the mold between the first end and the second end and is centrally positioned between the top panel and the bottom panel, the mold being rotatable between a first orientation wherein the mold is in an orientation that is between +/−15° from vertical and a second orientation wherein the mold is in an orientation that is between +/−15° from horizontal.

2. The form as recited in claim 1, wherein the front panel is movable on or removable from the mold to provide an access opening to the compartment when the mold is in the second orientation.

3. The form as recited in claim 1, wherein the top panel is movable on or removable from the mold to provide an access opening to the compartment when the mold is in the first orientation.

4. The form as recited in claim 1, wherein the mold further comprises:
    a first side panel extending between the first side of the front panel and the rear panel; and
    a second side panel extending between the second side of the front panel and the rear panel.

5. The form as recited in claim 4, wherein the compartment has a maximum height extending between the top panel and the bottom panel, a maximum width extending between the front panel and the rear panel, and a maximum length extending between the first side panel and the second side panel, wherein the maximum height and the maximum length both are greater than the maximum width by a factor of at least 5.

6. The form as recited in claim 5, wherein the maximum height is at least 1.5 meters, the maximum length is at least 1.5 meters, and the maximum width is less than 0.2 meters.

7. The form as recited in claim 1, wherein the compartment has an elongated rectangular configuration.

8. The form as recited in claim 1, wherein the front panel and the rear panel are disposed in parallel alignment or the top panel and the bottom panel are disposed in parallel alignment.

9. The form as recited in claim 1, further comprising:
    a first axle outwardly projecting from the first end of the mold, the first axle being rotatably disposed on a shaft support disposed on the first riser; and
    a second axle outwardly projecting from the second end of the mold, the second axle being rotatably disposed on a shaft support disposed on the second riser.

10. The form as recited in claim 9, wherein the first axle is centrally disposed on the first end of the mold.

11. The form as recited in claim 1, further comprising:
    a base extending between the first riser and the second riser; and
    a rest upwardly extending from the base, the mold being supported on the rest when the mold is in the second orientation and the mold being spaced apart from the rest when the mold is in the first orientation.

12. The form as recited in claim 11, further comprising means extending between the base and the mold for selectively moving the mold between the first orientation and the second orientation.

13. The form as recited in claim 12, wherein the means for selectively moving the mold comprises a hydraulic or pneumatic cylinder having a first end connected to the base and an opposing second end connected to the mold.

14. A method for forming a barrier wall, the method comprising:

positioning a mold in a first orientation, the mold having a rear wall and an encircling sidewall that upstands from the rear wall, the rear wall and the encircling sidewall at least partially bounding a compartment, an upper end of the encircling sidewall at least partially bounding a first access opening to the compartment;

dispensing a first material into the compartment through the first access opening, at least a portion of the first material being curable;

securing a front wall over the first access opening;

rotating the mold over an angle of at least 75° from the first orientation to a second orientation;

moving a portion of the sidewall of the mold when the mold is in the second orientation to form a second access opening to the compartment; and dispensing a second material into the compartment, at least a portion of the second material being curable.

15. The method as recited in claim 14, wherein dispending the first material comprises:

forming a layer of noise absorbing material on the rear wall of the mold; and forming a layer of a cementitious material on top of the layer of the noise absorbing material, the noise absorbing material being better able to absorb noise than the cementitious material.

16. The method as recited in claim 15, wherein the noise absorbing material comprises natural rubber, synthetic rubber, wood, or polymeric foam.

17. The method as recited in claim 16, wherein the noise absorbing material further comprises hydraulic cement and lightweight aggregate.

18. The method as recited in claim 15, wherein the cementitious material comprises hydraulic cement and aggregate.

19. The method as recited in claim 15, wherein the cementitious material, when cured, has a density and compressive strength that is greater than a density and compressive strength of the noise absorbing material.

20. The method as recited in claim 14, wherein the second material comprises a cementitious material.

21. The method as recited in claim 14, wherein a hydraulic or pneumatic cylinder is used for rotating the mold from the first orientation to the second orientation.

22. The method as recited in claim 14, wherein the first material and the second material form a self-supporting wall when the materials have hardened, the method further comprising removing the wall from the mold.

23. The method as recited in claim 14, further comprising placing a liner on an interior surface of the rear wall prior to dispensing a first material into the compartment so that the liner is disposed within the compartment, the liner having a three dimensional design or texture formed thereon.

24. The method as recited in claim 14, wherein the rear wall is in a horizontal orientation when the mold is in the first orientation and the rear wall is in a vertical orientation when the mold is in the second orientation.

25. The method as recited in claim 14, wherein dispending the first material comprises:

positioning a self-supporting panel comprised of a noise absorbing material on the rear wall of the mold; and forming a layer of a cementitious material on top of the self-supporting panel, the self-supporting panel being better able to absorb noise than the cementitious material.

26. A form for forming a barrier wall, the form comprising:

a mold bounding a compartment having a volume of at least 0.2 cubic meters ($m^3$), the mold comprising a front panel and an opposing rear panel each having an upper end and an opposing lower end that extend between a first side and an opposing second side, the mold further comprising:

a bottom panel extending between the lower end of the front panel and the rear panel; and a top panel extending between the upper end of the front panel and the rear panel;

a stand comprising:

an upstanding first riser, a first end of the mold being rotatably connected to the first riser; and an upstanding second riser, a second end of the mold that is opposite the first end being rotatably connected to the second riser, a base extending between the first riser and the second riser; and a rest upwardly extending from the base, wherein the mold is rotatably mounted on the stand so that the mold can rotate between a first orientation wherein the mold is in an orientation that is between +/−15° from vertical and a second orientation wherein the mold is in an orientation that is between +/−15° from horizontal, the mold being supported on the rest when the mold is in the second orientation and the mold being spaced apart from the rest when the mold is in the first orientation.

27. The form as recited in claim 26, further comprising means extending between the base and the mold for selectively moving the mold between the first orientation and the second orientation.

28. The form as recited in claim 27, wherein the means for selectively moving the mold comprises a hydraulic or pneumatic cylinder having a first end connected to the base and an opposing second end connected to the mold.

* * * * *